US012613646B2

(12) United States Patent
Sharma et al.

(10) Patent No.: US 12,613,646 B2
(45) Date of Patent: Apr. 28, 2026

(54) DATA STORAGE DEVICE AND METHOD FOR PROVIDING PROLONGED HIGH PERFORMANCE FOR TENANTS IN A MULTI-TENANCY ENVIRONMENT

(71) Applicant: Sandisk Technologies, Inc., Milpitas, CA (US)

(72) Inventors: Amit Sharma, Bangalore (IN); Dinesh Kumar Agarwal, Bangalore (IN); Abhinandan Venugopal, Mysore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/804,492

(22) Filed: Aug. 14, 2024

(65) Prior Publication Data

US 2026/0050386 A1    Feb. 19, 2026

(51) Int. Cl.
    *G06F 3/06* (2006.01)
(52) U.S. Cl.
    CPC .......... *G06F 3/0631* (2013.01); *G06F 3/0616* (2013.01); *G06F 3/0679* (2013.01)
(58) Field of Classification Search
    CPC ..... G06F 3/0631; G06F 3/0616; G06F 3/0679
    See application file for complete search history.

(56) References Cited

U.S. PATENT DOCUMENTS

| | | | |
|---|---|---|---|
| 7,287,118 | B2 | 10/2007 | Chang et al. |
| 9,646,019 | B2 | 5/2017 | Factor et al. |
| 9,959,067 | B2 | 5/2018 | Yang et al. |
| 10,409,509 | B2 | 9/2019 | Bivens et al. |
| 10,802,757 | B2 | 10/2020 | Zentz et al. |
| 2009/0287875 | A1* | 11/2009 | Lin ..................... G06F 12/0246 |
| | | | 711/E12.008 |
| 2012/0191900 | A1* | 7/2012 | Kunimatsu ........... G06F 3/0638 |
| | | | 711/E12.008 |
| 2015/0058530 | A1* | 2/2015 | Reddy .................. G06F 3/0679 |
| | | | 711/103 |
| 2015/0067239 | A1* | 3/2015 | Chu .................... G06F 12/0246 |
| | | | 711/103 |
| 2019/0179548 | A1* | 6/2019 | Lee .......................... G06F 3/061 |
| 2021/0294739 | A1* | 9/2021 | Oh ........................... G06F 9/546 |
| 2023/0251788 | A1* | 8/2023 | Bordia ................... G06F 3/064 |
| | | | 711/154 |

* cited by examiner

*Primary Examiner* — Kevin Verbrugge

(74) *Attorney, Agent, or Firm* — Crowell & Moring LLP

(57) ABSTRACT

A data storage device and method are disclosed for providing prolonged high performance for tenants in a multi-tenancy environment. In one embodiment, a data storage device determines whether a first block of the memory allocated to a first tenant can satisfy a performance requirement of the first tenant. In response to determining that the first block cannot satisfy the performance requirement of the first tenant, the data storage device exchanges the first block with a second block of the memory allocated to a second tenant, wherein the second block can satisfy the performance requirement of the first tenant and the first block can satisfy the performance requirement of the second tenant. Other embodiments are provided.

20 Claims, 11 Drawing Sheets

TO HOST

NON-VOLATILE
STORAGE SYSTEM

CONTROLLER  102

100

104  NON-VOLATILE
MEMORY

STORAGE MODULE
200

TO HOST

202  STORAGE
CONTROLLER

204

102  CONTROLLER     102  CONTROLLER     102  CONTROLLER 100                 100                 100

NVM  104           NVM  104           NVM  104

HOST  252   · · · ·   HOST  252   HIERARCHICAL STORAGE
SYSTEM
250

202  STORAGE      · · ·      202  STORAGE
CONTROLLER                        CONTROLLER

204  STORAGE      · · ·      204  STORAGE
SYSTEM                            SYSTEM

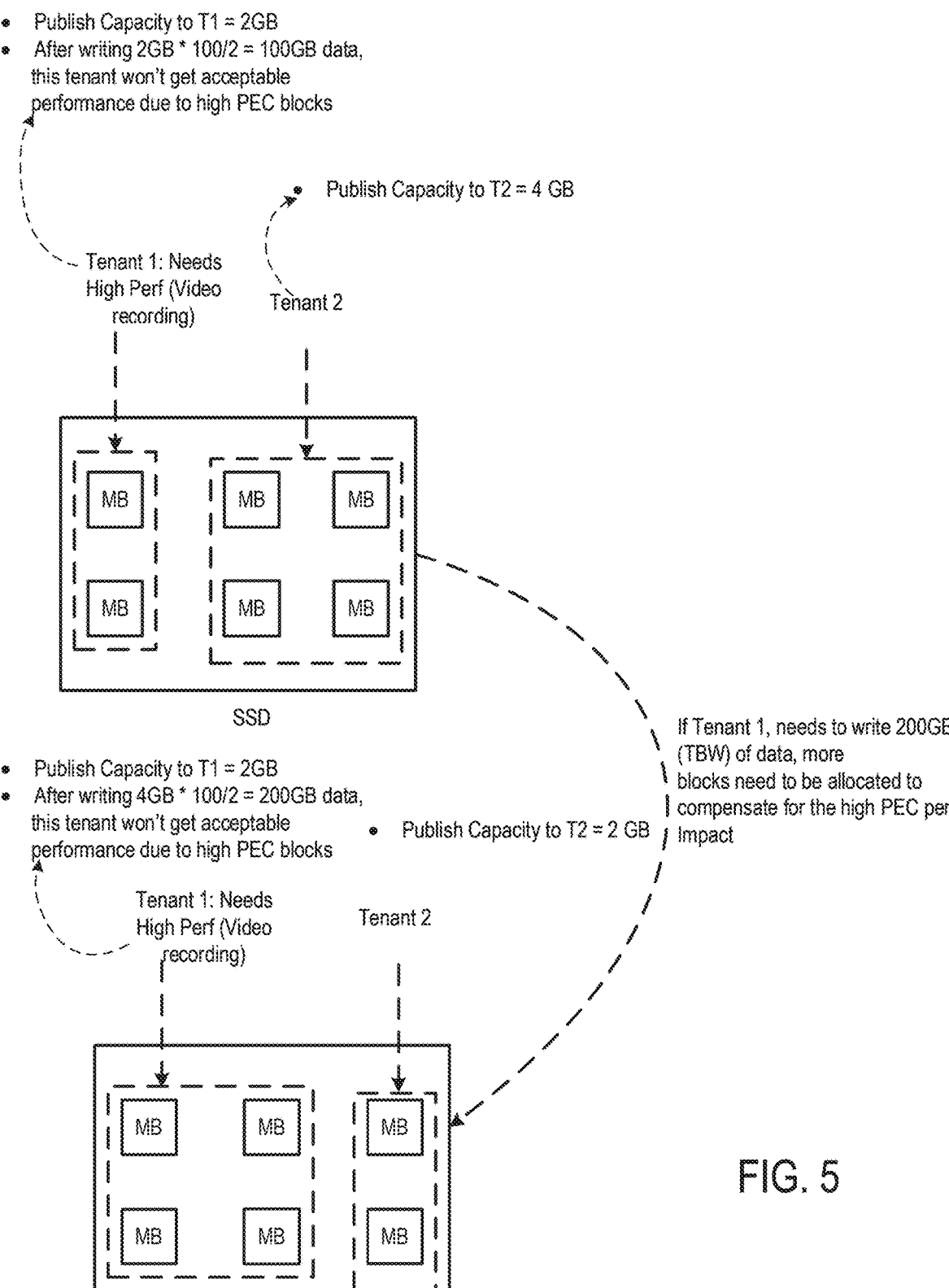

- Publish Capacity to T1 = 2GB
- After writing 2GB * 100/2 = 100GB data, this tenant won't get acceptable performance due to high PEC blocks Publish Capacity to T2 = 4 GB Tenant 1: Needs High Perf (Video recording)

Tenant 2

SSD

- Publish Capacity to T1 = 2GB
- After writing 4GB * 100/2 = 200GB data, this tenant won't get acceptable performance due to high PEC blocks Publish Capacity to T2 = 2 GB If Tenant 1, needs to write 200GB (TBW) of data, more blocks need to be allocated to compensate for the high PEC perf Impact Tenant 1: Needs High Perf (Video recording)

Tenant 2

FIG. 5

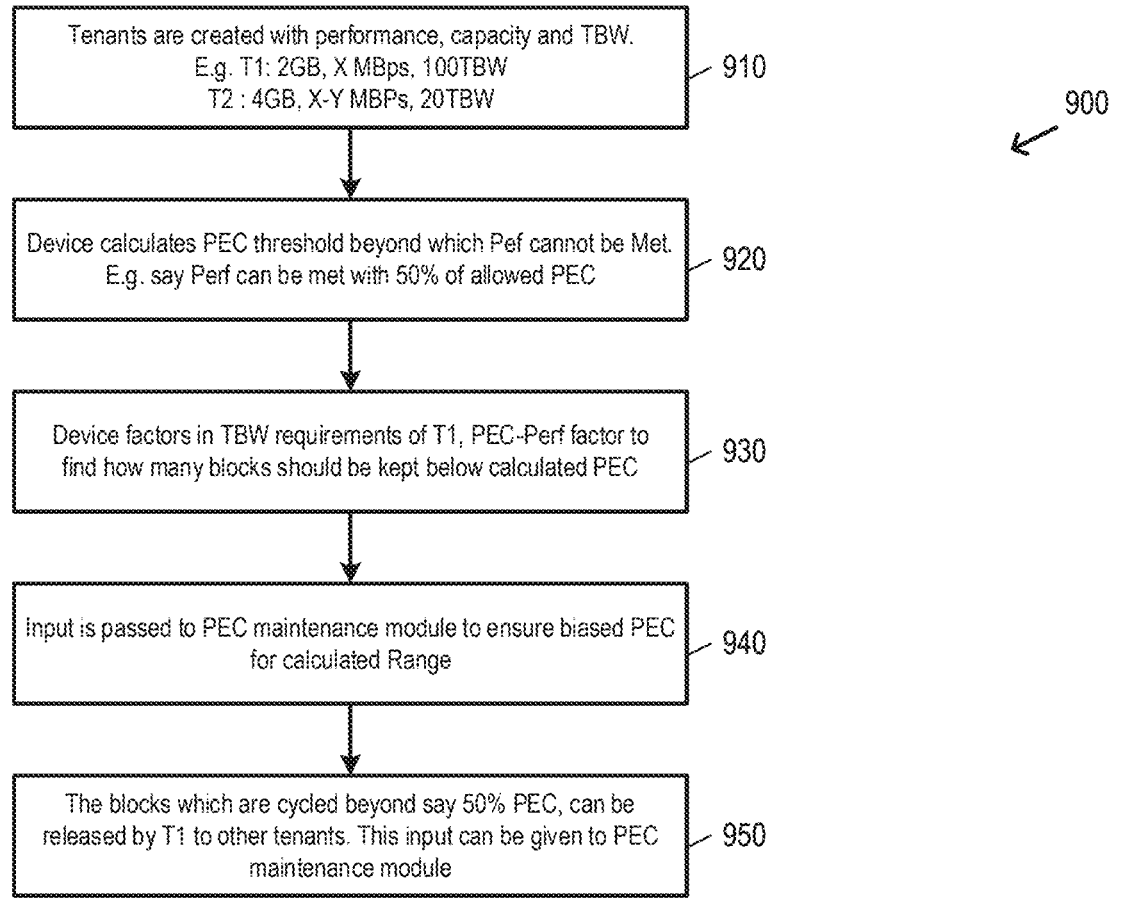

Tenants are created with performance, capacity and TBW.
E.g. T1: 2GB, X MBps, 100TBW
T2 : 4GB, X-Y MBPs, 20TBW    — 910

Device calculates PEC threshold beyond which Pef cannot be Met.
E.g. say Perf can be met with 50% of allowed PEC    — 920

Device factors in TBW requirements of T1, PEC-Perf factor to
find how many blocks should be kept below calculated PEC    — 930

Input is passed to PEC maintenance module to ensure biased PEC
for calculated Range    — 940

The blocks which are cycled beyond say 50% PEC, can be
released by T1 to other tenants. This input can be given to PEC
maintenance module    — 950

DATA STORAGE DEVICE AND METHOD FOR PROVIDING PROLONGED HIGH PERFORMANCE FOR TENANTS IN A MULTI-TENANCY ENVIRONMENT

BACKGROUND

Multi-tenancy in a data storage device, such as a solid-state drive (SSD), refers to the ability of the data storage device to efficiently support multiple independent users/tenants in a host. Blocks in the memory are allocated to each tenant, and the performance of the blocks can decrease over time as the program-erase count of the blocks increases.

BRIEF DESCRIPTION OF THE DRAWINGS

FIG. 5 is a diagram that illustrates an environment in which a fixed number of blocks are attached to a tenant.

FIG. 9 is a flow chart of a method of an embodiment for providing prolonged high performance for tenants in a multi-tenancy environment.

DETAILED DESCRIPTION

Figures 1A, 1B, 1C:
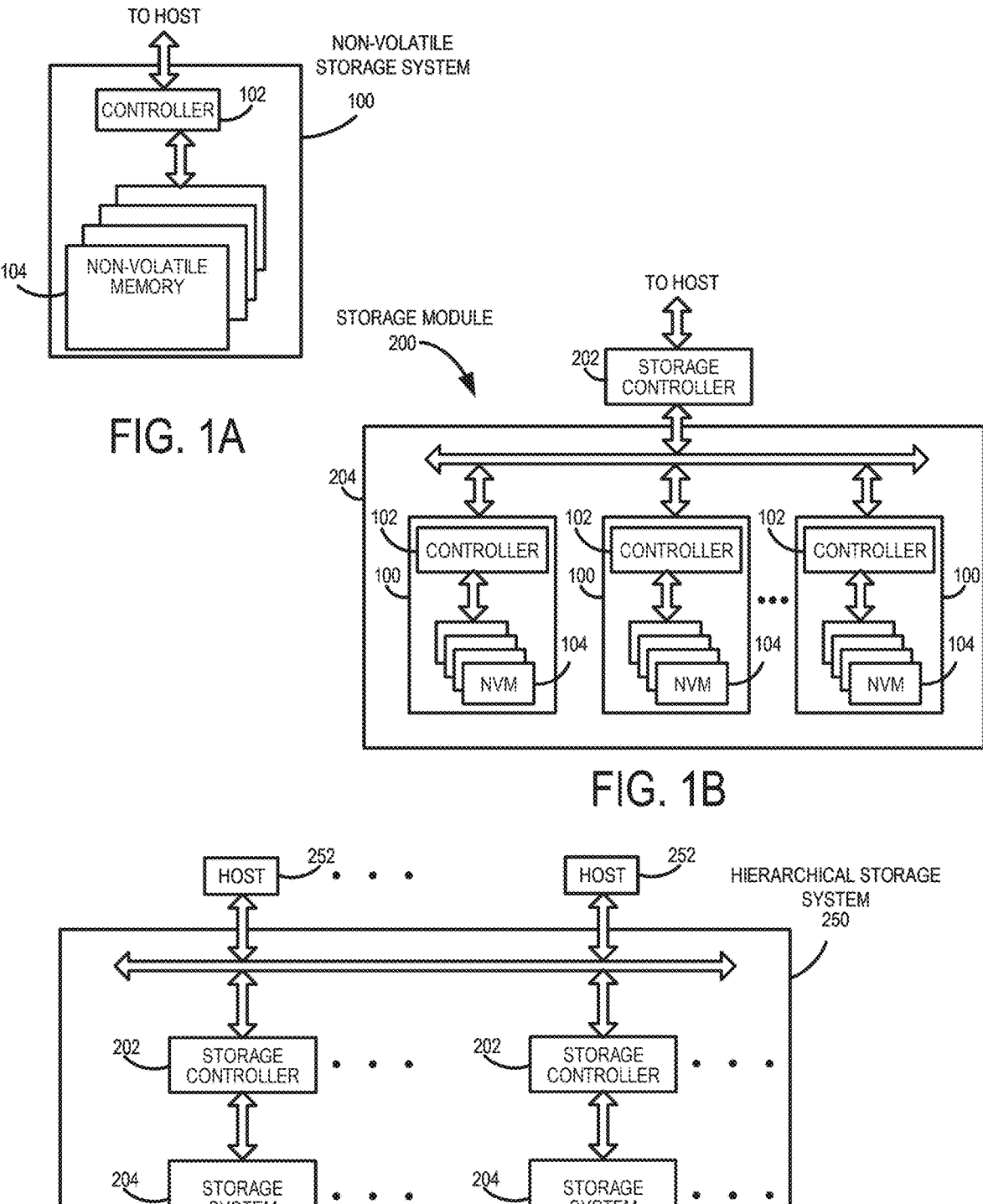
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for providing prolonged high performance for tenants in a multi-tenancy environment. In one embodiment, a data storage device is provided comprising a memory and one or more processors. The one or more processors, individually or in combination, are configured to: determine whether a program-erase count of a first block of the memory allocated to a first tenant is above a threshold for meeting a performance requirement of the first tenant; and in response to determining that the program-erase count of the first block is above the threshold: identify a second tenant that has both (i) a performance requirement that is met by the program-erase count of the first block and (ii) an allocated second block with a program-erase count that is not above the threshold; and reallocate the first and second blocks, wherein the second block is reallocated to the first tenant and the first block is reallocated to the second tenant.

In some embodiments, reallocating the first and second blocks allows the first tenant to meet its performance requirement without use of overprovisioned blocks.

In some embodiments, the one or more processors, individually or in combination, are further configured to calculate the threshold.

In some embodiments, the one or more processors, individually or in combination, are further configured to ensure that the program-erase count of a subset of the blocks of the memory is kept below the threshold so the subset can be made available to the first tenant, if needed.

In some embodiments, the one or more processors, individually or in combination, are further configured to: receive, from a host, a query regarding an additional amount of data that can be written to the first block before the program-erase count of the first block exceeds the threshold; calculate the additional amount of data; and send, to the host, a response to the query by identifying the additional amount of data.

In some embodiments, the one or more processors, individually or in combination, are further configured to perform dynamic tenant creation by creating a new tenant only if the data storage device can support the new tenant's performance requirement.

In some embodiments, the data storage device is one of a plurality of data storage devices in a storage environment and a new tenant is created in a given data storage device only if that given data storage device can support the new tenant's performance requirement.

In some embodiments, the performance requirement of the first tenant is for video recording.

In some embodiments, a total bytes written (TBW) parameter is considered when creating the first tenant.

In some embodiments, the data storage device comprises a solid-state drive (SSD).

In some embodiments, the memory comprises a three-dimensional memory.

In another embodiment, a method is provided that is performed in a data storage device comprising a memory. The method comprises: determining whether a first block of the memory allocated to a first tenant can satisfy a performance requirement of the first tenant; and in response to determining that the first block cannot satisfy the performance requirement of the first tenant, exchange the first block with a second block of the memory allocated to a second tenant, wherein the second block can satisfy the performance requirement of the first tenant and the first block can satisfy the performance requirement of the second tenant.

In some embodiments, exchanging the first and second blocks allows the first tenant to meet its performance requirement without use of overprovisioned blocks.

In some embodiments, determining whether the first block can satisfy the performance requirement of the first tenant comprises determining whether a program-erase count of the first block is above a threshold.

In some embodiments, the method further comprises calculating the threshold.

In some embodiments, determining whether the program-erase count of the first block is above the threshold is performed by a program-erase count module in the data storage device.

In some embodiments, the method further comprises ensuring that a subset of the blocks of the memory are able to meet the performance requirement of the first tenant.

In some embodiments, the method further comprises responding to an inquiry from a host regarding how much data can be written to the first block before the first block cannot meet the performance requirement of the first tenant.

In some embodiments, the method further comprises performing dynamic tenant creation.

In another embodiment, a data storage device is provided comprising: a memory; and means for reallocating blocks of memory previously-allocated to first and second tenants so that the reallocated blocks satisfy performance requirement of the first and second tenant.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
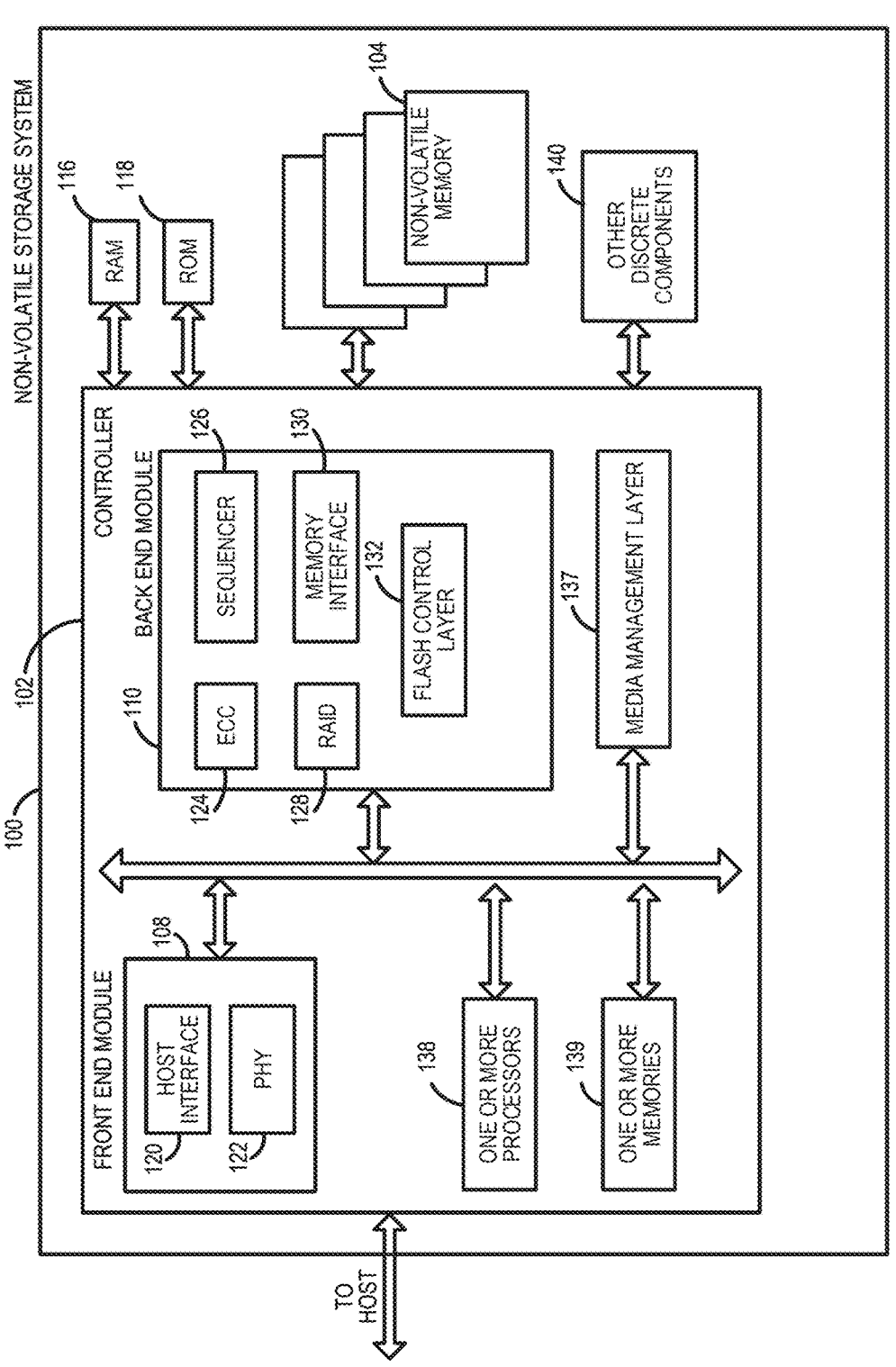
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/ or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
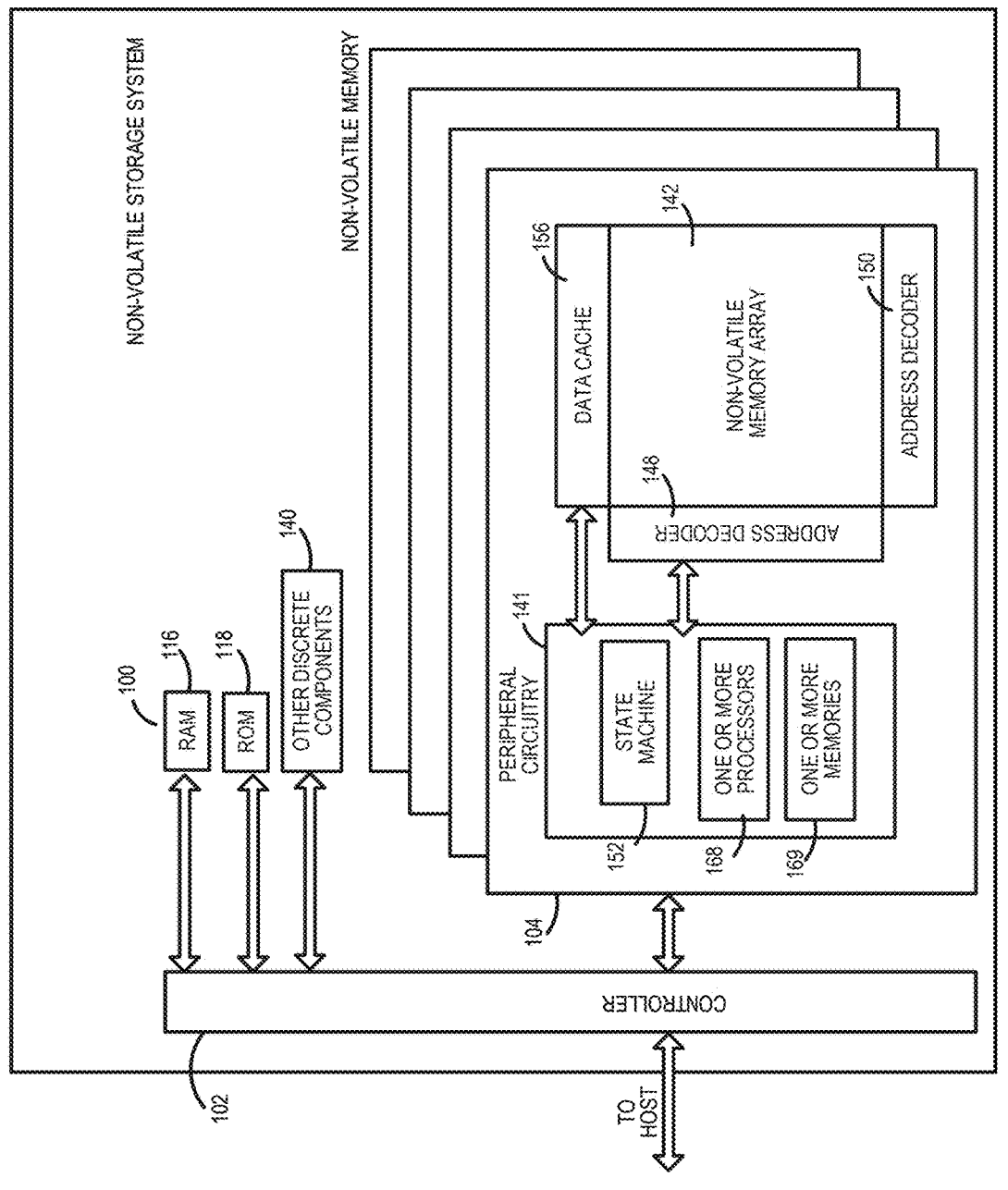
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL)) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host.

Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
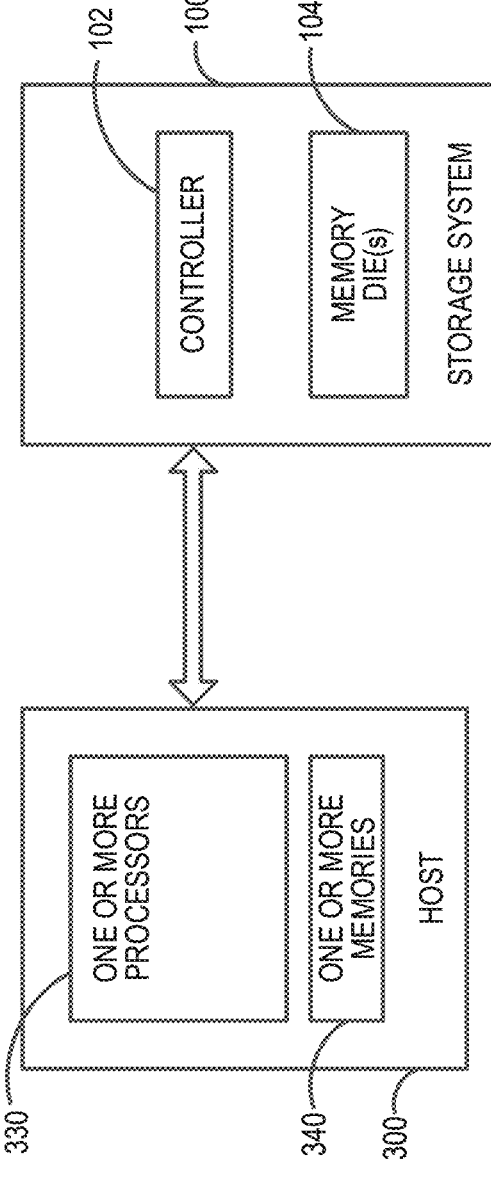
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
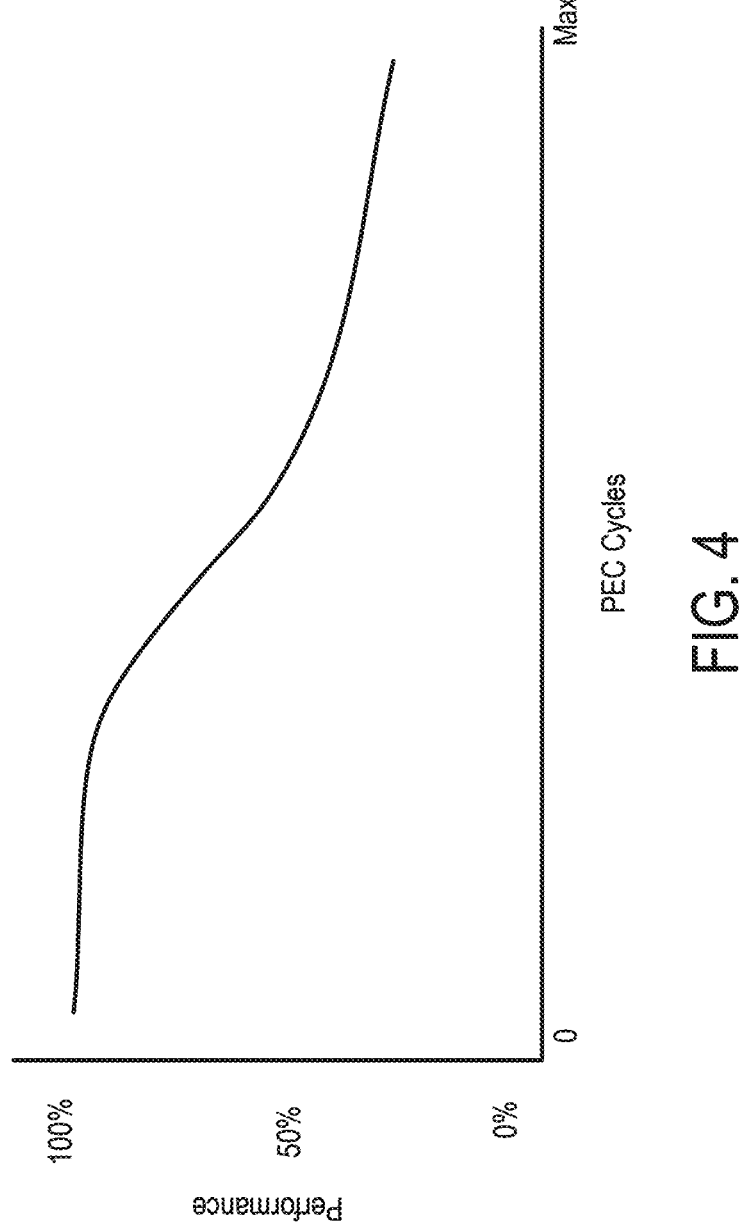
FIG. 4 is a graph of program-erase count (PEC) versus memory performance.

As mentioned above, multi-tenancy in a data storage device, such as a solid-state drive (SSD), refers to the ability of the data storage device to efficiently support multiple independent users/tenants. Tenants with various characteristics can be created in the data storage device. Depending on tenant storage requirements, certain capacity (e.g., meta-blocks, which are blocks formed across a plurality of memory dies) can be allocated to a tenant. As the cycling of memory blocks increases (e.g., as the program-erase count/cycle (PEC) increases), the performance of the blocks decreases, as shown in the PEC cycles versus memory performance graph in FIG. 4. For example, blocks that are cycled 50% of an allowed limit can experience a higher erase time, more read errors (hence, an increased decode time), and an increased program time (especially if the bit-error rate (BER) after programming has to be kept low) as compared to blocks that have not been cycled as much.

In a multi-tenant storage environment, some tenants may require consistently high speed throughout the entire life-cycle; otherwise, the data storage device might be considered unusable. Meanwhile, other tenants might have less demand for high throughput. For example, a tenant that is recording videos can consistently require a specific, predetermined amount of data be sent to the data storage device. Similarly, while reading a video stream from the data storage device, a host can expect certain throughput to ensure jitter-free playback. If high PEC causes a performance drop, the data storage device may become unusable for specific tenants.

The following embodiments can be used to reduce or eliminate the high-PEC impact on throughput provided to specific tenants. These embodiments also describe tenant-device communications aimed at finding an available performance throughput from the data storage device throughout the life cycle. More specifically, one embodiment relates to tenant-performance-factored-biased PEC management of a data storage device. This can involve the ability of the host to inquire about how long a tenant can achieve a desired performance from the data storage device (e.g., in terms of the amount of data it can write). This can also involve the ability to query if an on-demand tenant with certain performance requirement can be created on the data storage device.

One of the aims of a flash translation layer (FTL) in the data storage device's controller is to ensure uniform PEC of all blocks, which is also known as wear leveling. The controller (using the FTL) can select blocks with the lowest-PEC-available block. In certain cases, if a block is too cold (i.e., a block with a PEC below a threshold), the controller can move the data from the block to a different block and put this low PEC block back into the cycling process. In this way, the data storage device can attempt to keep all blocks in the memory at same PEC level.

To ensure high performance throughout the life cycle, a fixed number of blocks can be attached to a tenant. An example will be illustrated in conjunction with FIG. 5. In this example, each metablock ("MB") has a capacity of 1 GB, there are 100 allowed PECs, and the performance of a metablock drops after 50% of the allowed PEC. Also, in this example, there are two tenants (T1 and T2) created on a data storage device (here, an SSD) having a capacity of 2 GB and 4 GB, respectively. After consuming half of the PEC of a block, performance drops and does not meet the requirements of T1. To handle these cases, extra blocks are over-provisioned to T1, but these extra blocks are not added to device capacity (to simplify the drawing, FIG. 5 does not show the extra overprovisioning blocks). Hence, with this arrangement, T1's performance is met on the expense of reduced capacity of T2.

Figure 6:
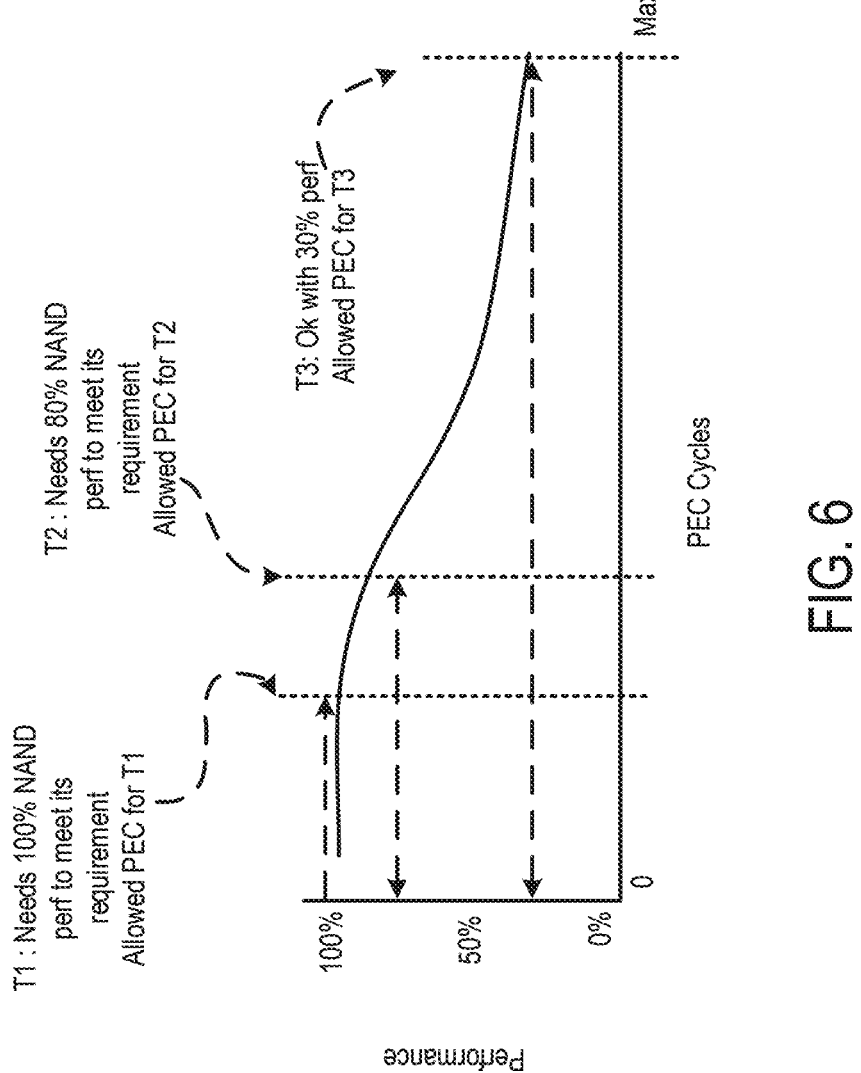
FIG. 6 is a graph of performance versus program-erase count.

As shown by this example, allocating fixed blocks to a tenant is not an optimized solution as it reduces the device capacity. To address this problem, in one embodiment, the controller 102 of the data storage device 100 manages blocks in a common pool and, based on tenant performance requirements, calculates an allowed PEC for each tenant. This is illustrated in the graph of FIG. 6. In this example, Tenant 1 (T1) needs 100% memory performance to meet its requirement, so the controller 102 allows a relatively-low PEC for T1. Tenant 2 (T2) needs 80% memory performance to meet its requirement, so the controller 102 allows a relatively-higher PEC for T2. Tenant 3 (T3) finds 30% memory performance acceptable, so the controller 102 allows a relatively-high PEC for T3.

Figure 7:
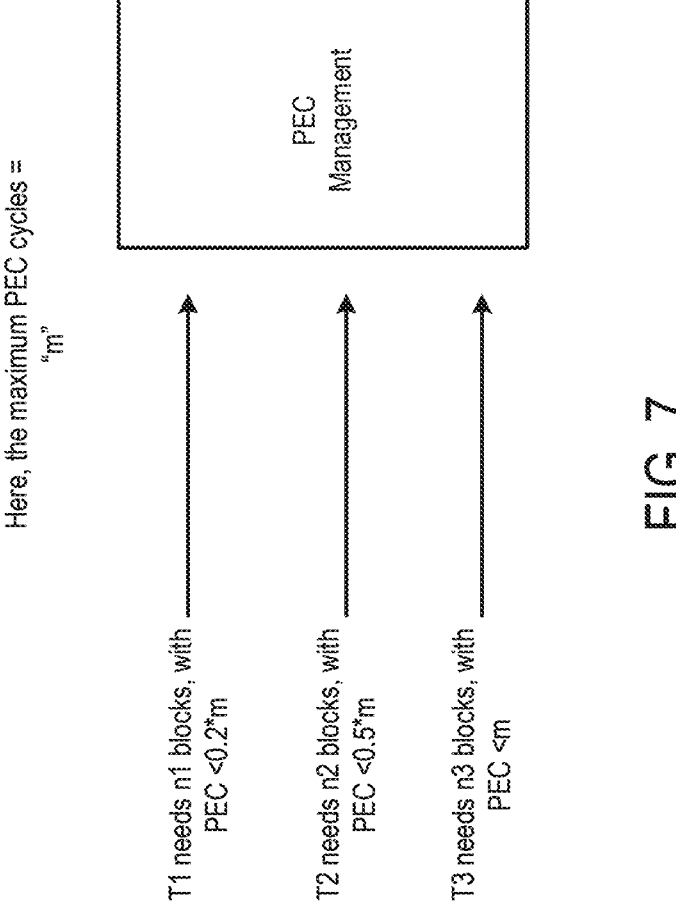
FIG. 7 is an illustration of a program-erase count management module of an embodiment.

As shown in FIG. 7, the allowed PEC for certain tenants can be passed to PEC management module, which can be in the controller 102 or in another component in the data storage device 100. In this embodiment, a PEC algorithm can create a bias in the PEC management module with the aim to keep PEC of certain blocks below a required threshold. In other words, the PEC management module (using a block selection policy) can factor the performance requirements of various tenants. With this policy, it may happen that certain blocks have a low PEC compared to others in system. This enables the controller 102 to release "low-performance, worn-out" blocks to other tenants that do not have a relatively-high performance requirement.

Figure 8:
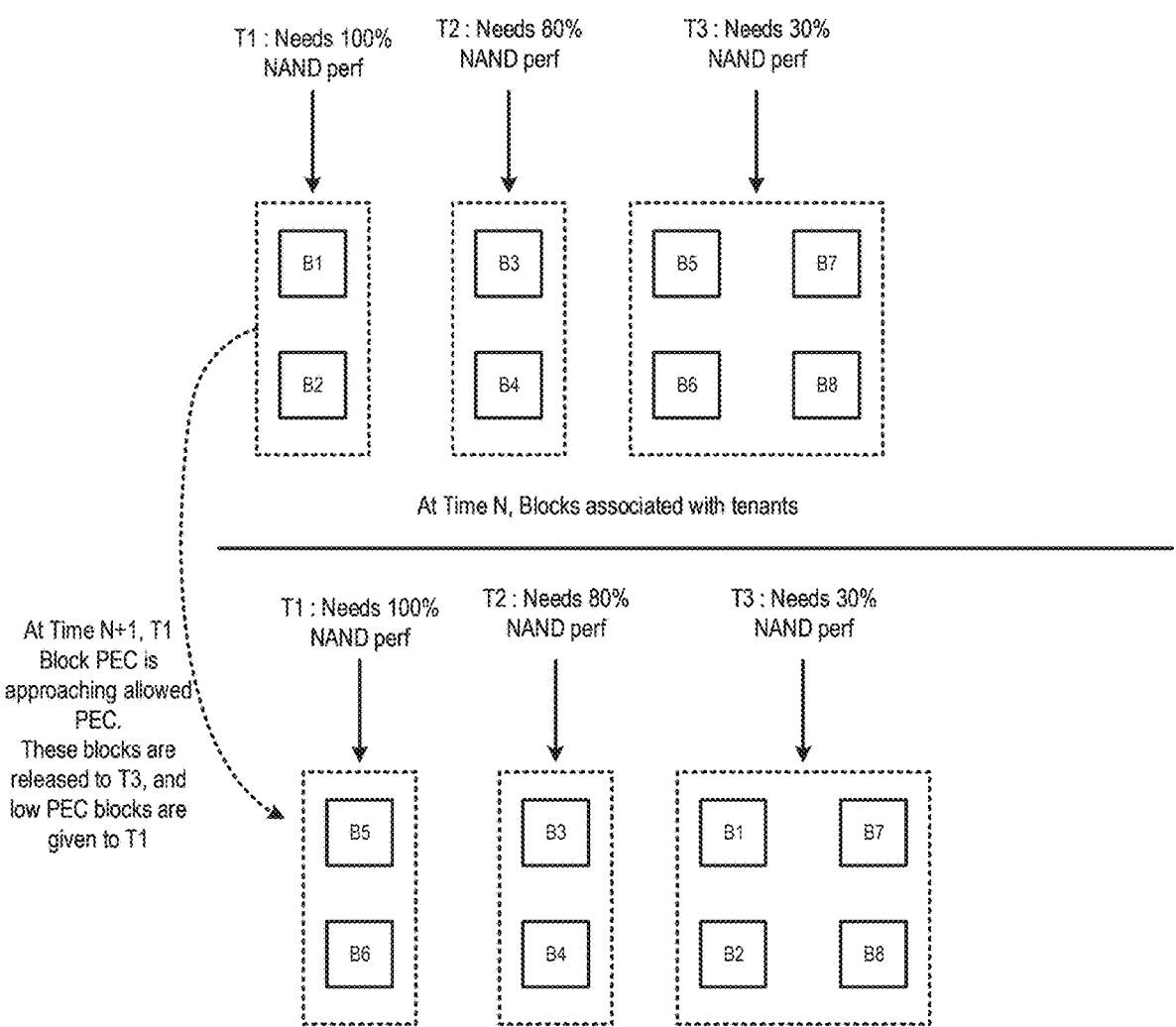
FIG. 8 is a diagram that illustrates a block association method of an embodiment that factors in program-erase count and performance requirements.

FIG. 8 illustrates an example of block association by factoring in PEC and performance requirements. In this example, Tenant 1 (T1) needs 100% memory performance, Tenant 2 (T2) needs 80% memory performance, and Tenant 3 (T3) finds 30% memory performance acceptable. At Time N, all of the blocks have a PEC less than 20%. At Time N+1, Blocks B1-B4 have a PEC between 20% and 50%. As T1 is approaching its allowed PEC, T1's blocks are released to T3, and T3's low PEC blocks are given to T1. So, in this example, when Blocks B1 and B2 are getting worn out, the controller 102 swaps-out these blocks with T3 before their PEC level goes below an acceptable limit.

FIG. 9 is a flow chart 900 of a method of an embodiment for providing prolonged high performance for tenants in a multi-tenancy environment. As shown in FIG. 9, tenants are created with performance, capacity, and total bytes written (TBW) requirements (910). The controller 102 then calculates the PEC threshold beyond which performance cannot by met (920). The controller 102 determines how many blocks of memory 104 should be kept below the calculated PEC (930). Input is then passed to the PEC maintenance module (e.g., in the controller 102) to ensure biased PEC for the calculated range (940). Then, the controller 102 releases blocks from one tenant to other tenants (950). It should be noted that while creating a tenant, the TBW and performance requirement of all tenants can be factored in to find the optimal supported capacity of the data storage device 100. In cases where all tenants need high TBW, creating this bias PEC might not be possible.

In another embodiment, the host 300 is configured with the ability to query the data storage device 100 regarding how long (e.g., in terms of TBW) desired performance can be provided by the data storage device 100. The above embodiments can be used at any point of time to figure out if a tenant can achieve high performance and for how long. If the TBW of a tenant with relatively low-performance requirement is less than a threshold, relatively-low PEC blocks can be allocated to a tenant with a relatively-high performance requirement. This can extend the usability of the data storage device 100. Consider an example in which the data storage device 100 originally guaranteed that T1 can get performance up to 200 GB worth of data writes. After considering the current PEC of blocks, the data storage device 100 can inform the host 300 that 100 GB more data can be written with a relatively-high level of performance.

Figure 10:
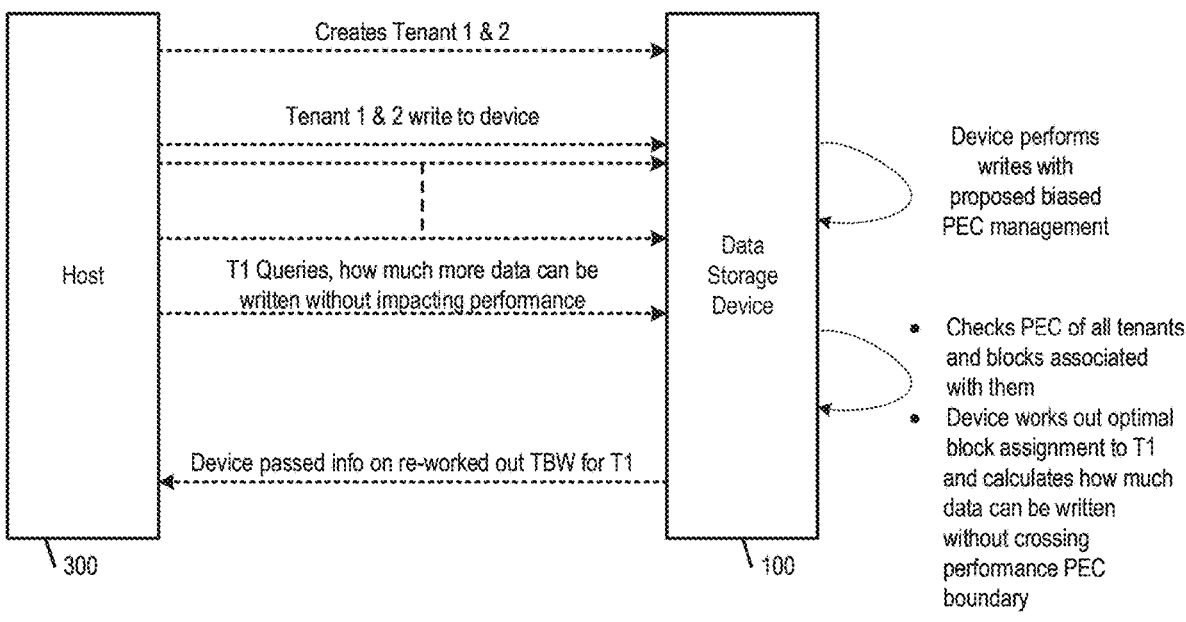
FIG. 10 is a diagram that illustrates a host-device handshake of an embodiment to find updated performance characteristics.

FIG. 10 is a diagram that illustrates a host-device handshake of an embodiment to find updated performance characteristics. As shown in FIG. 10, the host 300 creates Tenants 1 and 2, which write to the data storage device 100. Tenant 1 than queries the data storage device regarding how much more data can be written without impacting performance. The controller 102 of the data storage device 100 checks the PEC of all tenants and blocks associated with them, calculates a new block assignment for Tenant 1, and then responds to the host 300.

Another embodiment relates to dynamic high-performance tenant creation. The embodiments described above can be used to find out if a tenant with a relatively-high performance requirement can be created on a worn-out data storage device. The controller 102 can calculate how much data can be written with the asked performance.

Another embodiment relates to an environment with a plurality of data storage devices (e.g., a multi-SSD environment), in which the above methods are used to selectively attach tenants to different ones of the plurality of data storage devices based on, for example, performance of the data storage device, TBW, and performance requirement of the tenants. This can optimize the placement of a tenant with the appropriate data storage device.

There are several advantages associated with these embodiments. Multitenancy is a very sought-after feature, and high PEC impacts performance. These embodiments can be used to enable optimal PEC management of a data storage device, which can provide more capacity to the tenants (compared to fixed block allocation), elongate usage of the data storage device while meeting high performance requirements of tenants, and realign worn-out blocks based on device conditions to extend usage to tenants with relatively-high performance requirements.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:

a memory; and one or more processors, individually or in combination, configured to:

determine whether a program-erase count of a first block of the memory allocated to a first tenant is above a threshold for meeting a throughput requirement of the first tenant; and in response to determining that the program-erase count of the first block is above the threshold:

identify a second tenant that has both (i) a throughput requirement that is met by the program-erase count of the first block and (ii) an allocated second block with a program-erase count that is not above the threshold; and reallocate the first and second blocks, wherein the second block is reallocated to the first tenant and the first block is reallocated to the second tenant.

2. The data storage device of claim 1, wherein reallocating the first and second blocks allows the first tenant to meet its throughput requirement without use of overprovisioned blocks.

3. The data storage device of claim 1, wherein the one or more processors, individually or in combination, are further configured to calculate the threshold.

4. The data storage device of claim 1, wherein the one or more processors, individually or in combination, are further configured to ensure that the program-erase count of a subset of the blocks of the memory is kept below the threshold so the subset can be made available to the first tenant, if needed.

5. The data storage device of claim 1, wherein the one or more processors, individually or in combination, are further configured to:

receive, from a host, a query regarding an additional amount of data that can be written to the first block before the program-erase count of the first block exceeds the threshold;

calculate the additional amount of data; and send, to the host, a response to the query by identifying the additional amount of data.

6. The data storage device of claim 1, wherein the one or more processors, individually or in combination, are further configured to perform dynamic tenant creation by creating a new tenant only if the data storage device can support the new tenant's throughput requirement.

7. The data storage device of claim 1, wherein the data storage device is one of a plurality of data storage devices in a storage environment and a new tenant is created in a given data storage device only if that given data storage device can support the new tenant's throughput requirement.

8. The data storage device of claim 1, wherein the throughput requirement of the first tenant is for video recording.

9. The data storage device of claim 1, wherein a total bytes written (TBW) parameter is considered when creating the first tenant.

10. The data storage device of claim 1, wherein the data storage device comprises a solid-state drive (SSD).

11. The data storage device of claim 1, wherein the memory comprises a three- dimensional memory.

12. A method comprising:

performing in a data storage device comprising a memory:

determining whether a first block of the memory allocated to a first tenant can satisfy a throughput requirement of the first tenant; and in response to determining that the first block cannot satisfy the throughput requirement of the first tenant, exchanging the first block with a second block of the memory allocated to a second tenant, wherein the second block can satisfy the throughput requirement of the first tenant and the first block can satisfy the throughput requirement of the second tenant.

13. The method of claim 12, wherein exchanging the first and second blocks allows the first tenant to meet its throughput requirement without use of overprovisioned blocks.

14. The method of claim 12, wherein determining whether the first block can satisfy the throughput requirement of the first tenant comprises determining whether a program-erase count of the first block is above a threshold.

15. The method of claim 14, further comprising calculating the threshold.

16. The method of claim 14, wherein determining whether the program-erase count of the first block is above the threshold is performed by a program-erase count module in the data storage device.

17. The method of claim 12, further comprising ensuring that a subset of the blocks of the memory are able to meet the throughput requirement of the first tenant.

18. The method of claim 12, further comprising responding to an inquiry from a host regarding how much data can be written to the first block before the first block cannot meet the throughput requirement of the first tenant.

19. The method of claim 12, further comprising performing dynamic tenant creation.

20. A data storage device comprising:

a memory; and means for reallocating blocks of memory previously-allocated to first and second tenants so that the reallocated blocks satisfy throughput requirement of the first and second tenant.

* * * * *